J. B. HUNTER.
Gang-Plow.

No. 160,099. Patented Feb. 23, 1875.

WITNESSES:
E. Wolff
A. F. Terry

INVENTOR:
J. B. Hunter
BY Munn
ATTORNEYS.

THE GRAPHIC CO.PHOTO-LITH.39 & 41 PARK PLACE, N.Y.

UNITED STATES PATENT OFFICE.

JAMES B. HUNTER, OF ASHLEY, ILLINOIS.

IMPROVEMENT IN GANG-PLOWS.

Specification forming part of Letters Patent No. 160,099, dated February 23, 1875; application filed October 24, 1874.

*To all whom it may concern:*

Figure 1:
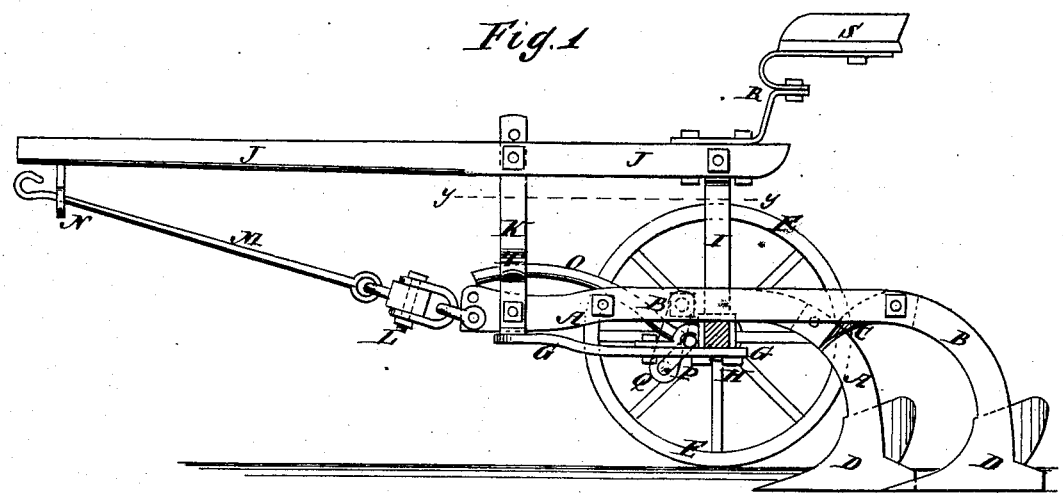
Figure 2:
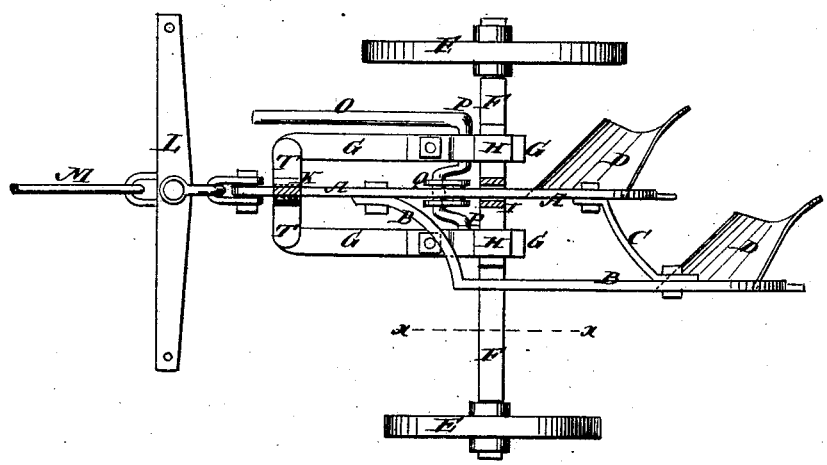

Be it known that I, JAMES B. HUNTER, of Ashley, in the county of Jefferson and State of Illinois, have invented a new and useful Improvement in Gang-Plow, of which the following is a specification:

Figure 1 is a side view of my improved gang-plow, partly in section, through the line $x\ x$, Fig. 2. Fig. 2 is a top view of the same, partly in section, through the line $y\ y$, Fig. 1.

Similar letters of reference indicate corresponding parts.

The invention will first be fully described, and subsequently pointed out in the claim.

A is the right-hand plow-beam, to the forward end of which the draft is attached. B is the left-hand plow-beam, the forward end of which is bent inward, and is bolted to the side of the beam A. The rear part of the beam B is held parallel with the beam A by a brace, C, the ends of which are bolted to the said beams A B. The rear ends of the beams A B are curved downward, and to them are attached the plows D. E are the wheels, which revolve upon the journals of the axle F. G is a U-shaped bar, the ends of which are secured to the axle F by clips H, which clips also secure the lower ends of the standard I to said axle F. The standard I is slotted, to receive the plow-beam A, and to its upper end is bolted the rear part of the tongue J. To the center or bend of the U-bar G is secured the lower end of the standard K, the upper end of which passes up through the tongue J, and is secured to said tongue by a bolt, several holes being formed in said standard to receive the said bolt, so that the tongue J can be conveniently raised and lowered upon the standard K, to adjust the plows to work deeper or shallower in the ground. The lower part of the standard K is slotted, to receive the plow-beam A, which is pivoted to it by a bolt, so that the sulky may be drawn from the said plow-beam. In the forward end of the plow-beam A are formed a number of holes, at different heights, to receive the bolt of the clevis by which the double-tree L is connected with said plow-beam. To the center of the forward side of the double-tree L is attached the rear end of the rod M, which passes through a guide-keeper, N, attached to the lower side of the forward part of the tongue J. Upon the forward end of the rod M is formed a hook or eye, for the convenient attachment of the forward team. O is a lever, formed upon or rigidly attached to the end of a crank-shaft, P, which works in bearings attached to the U-bar G, just in front of the axle F, and to the crank of which are pivoted the lower ends of two short bars, Q, the upper ends of which are pivoted to the opposite sides of the plow-beam A, so that by operating the lever O, the plow-beams may be raised, raising the plows from the ground. To the rear end of the tongue J is attached the lower end of the spring-standard R, to the upper end of which is attached the driver's seat S. To the opposite sides of the forward standard K are attached, or upon them are formed, short arms T, to serve as rests for the driver's feet.

Having thus described my invention, I claim as new and desire to secure by Letters Patent—

The combination of the fixed U-bar G, the slotted vertically-adjustable forward standard K, and slotted rear standard J, with the axle F, the plow-beams A B, and the tongue J, as herein shown and described.

J. B. HUNTER.

Witnesses:
SAMUEL JOHNSON,
SAMUEL J. CAMERON.